United States Patent [19]

Hirota

[11] Patent Number: 5,053,291
[45] Date of Patent: Oct. 1, 1991

[54] LATERAL LAYER-BUILT FUEL CELL STACK AND MODULE STRUCTURE THEREOF

[75] Inventor: Toshio Hirota, Kawasaki, Japan

[73] Assignee: Fuji Electric Co., Ltd., Kanagawa, Japan

[21] Appl. No.: 571,995

[22] Filed: Aug. 24, 1990

[30] Foreign Application Priority Data

Sep. 4, 1989 [JP] Japan .................................. 1-228655

[51] Int. Cl.[5] .............................................. H01M 8/24
[52] U.S. Cl. .......................................... 429/39; 429/41
[58] Field of Search ....................... 429/38, 39, 34, 40, 429/41, 14

[56] References Cited

U.S. PATENT DOCUMENTS

| | | | |
|---|---|---|---|
| 3,278,336 | 10/1966 | Uline et al. | 429/38 X |
| 4,195,119 | 3/1980 | Kummer | 429/38 |
| 4,526,843 | 7/1985 | Kaufman et al. | 429/38 X |
| 4,876,162 | 10/1989 | McElroy | 429/39 X |

*Primary Examiner*—Anthony Skapars
*Attorney, Agent, or Firm*—Spencer & Frank

[57] ABSTRACT

A lateral layer-built fuel cell stack comprising a fuel cell layered body including a plurality of unit cells each of which has a matrix layer for holding an electrolyte, a pair of electrode layers which are disposed on both sides of the matrix layer and a plurality of separators. Each of the separators has a plurality of vertical passages for reaction gases which are vertically arranged on one of major surfaces of the separators and a plurality of horizontal passages for reaction gases which are horizontally arranged on the other of the major surfaces of the separators. The unit cells and the separators are alternately superimposed so that each of the surfaces of the plurality of unit cells and separators is vertically arranged. A pair of first manifolds is provided which are disposed on the sides of the upper and the lower surfaces of the fuel cell layered body and which are communicated with the plurality of vertical passages. A pair of second manifolds are provided which are disposed on the side of opposite side surfaces of the fuel cell layered body and which are communicated with the plurality of horizontal passages. An oxidizing agent is supplied to the vertical passages and a fuel gas is supplied to the horizontal passages, respectively. The manifold positioned on the lower side of the fuel cell layered body also serves as a supporting member. The electrolyte is supplemented to each unit cell from the upper part thereof.

8 Claims, 6 Drawing Sheets

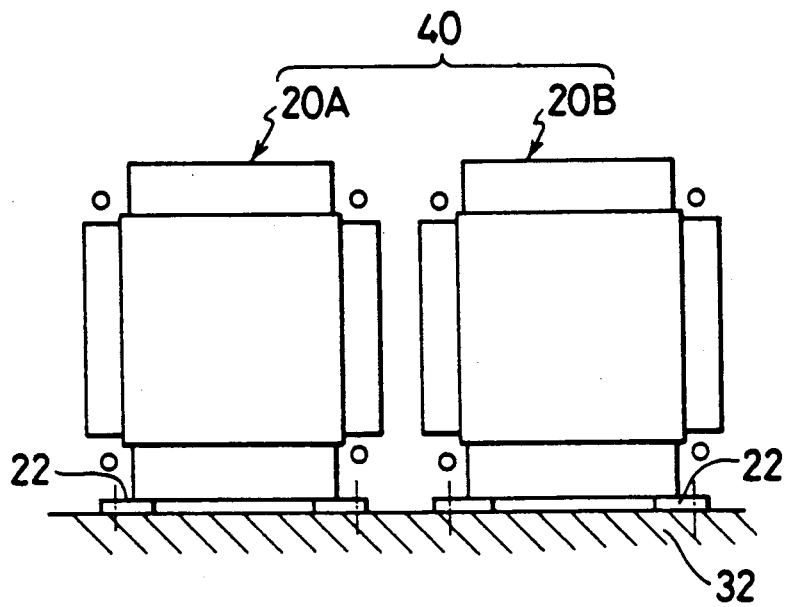
F I G. 4
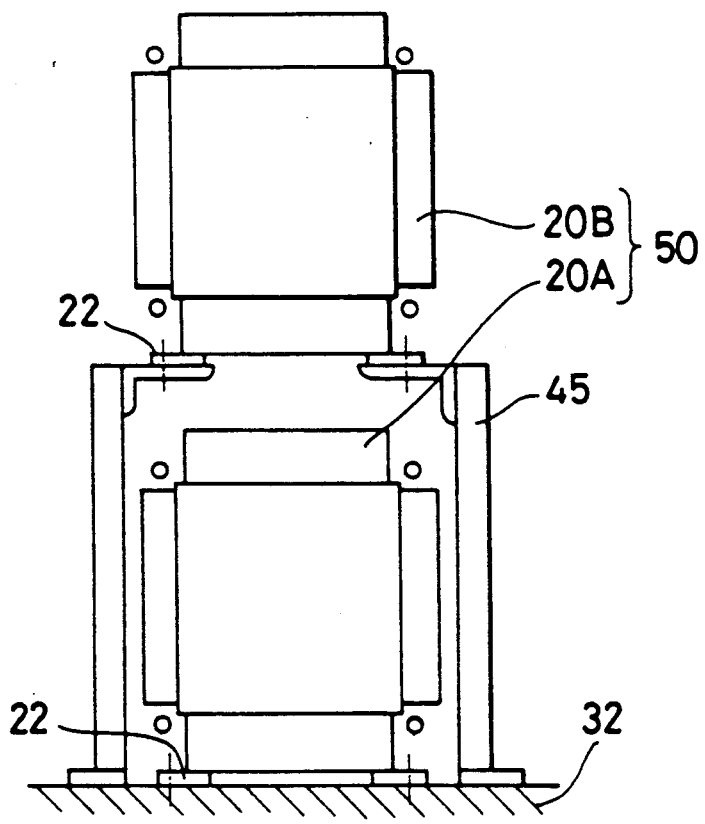
F I G. 5

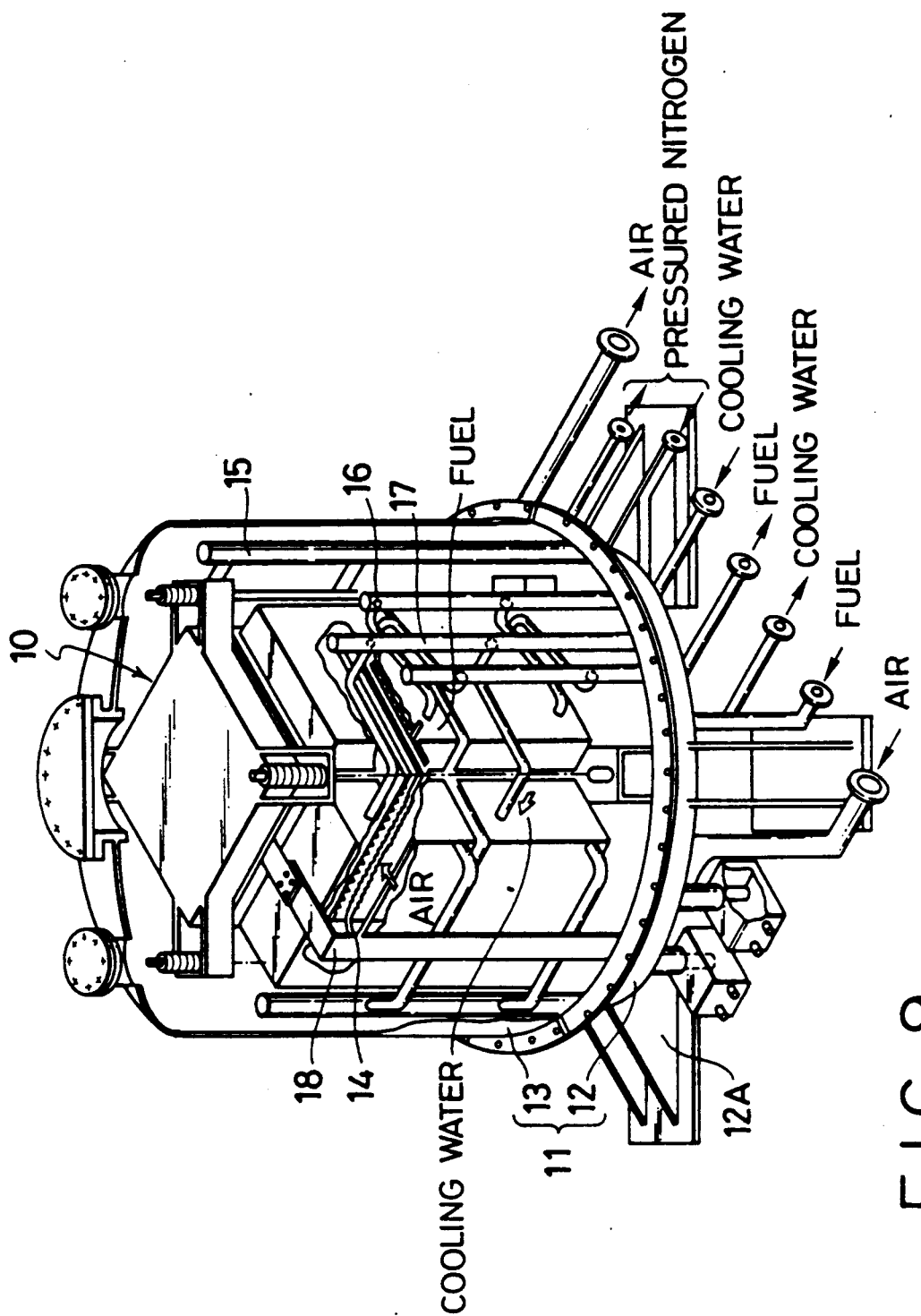

LATERAL LAYER-BUILT FUEL CELL STACK AND MODULE STRUCTURE THEREOF

BACKGROUND OF THE INVENTION

1. Field of the Invention

The present invention relates to a fuel cell having a matrix for holding an electrolyte and in particular to a layer-built structure and an installed structure of a fuel cell having a high capacity.

2. Description of the Prior Art

In a free-liquid surface type alkali fuel cell in which an alkaline aqueous solution is employed as an electrolyte, unit cells each of which comprises a chamber for containing an electrolyte and a pair of electrodes which sandwich the chamber therebetween are layered in the lateral direction so that the electrode surfaces are vertically arranged to thus form a fuel cell stack. On the other hand, a vertical layer-built fuel cell is the leading phosphoric acid type fuel cell in which phosphoric acid is employed as an electrolyte. The vertical layer-built fuel cell comprises unit cells, each of which comprises a matrix layer impregnated with phosphoric acid and a pair of electrodes, one of which is a hydrogen electrode, the other of which is an oxygen electrode and which sandwich the matrix layer therebetween and which are layered in the vertical direction so that the electrode surfaces are horizontally arranged to thus form a fuel cell stack. Presently, there has not been known any lateral layer-built phosphoric acid type fuel cell.

FIG. 8 is a perspective and partially cutaway view of a conventional fuel cell stack which is operated at normal pressure. In this fuel cell stack, unit cells 1, each of which comprises a pair of electrodes and a matrix holding phosphoric acid are sandwiched by the pair of electrodes. Grooved separators 2 are alternately arrayed to give a layered body 3. Both the upper and lower sides of the layered body 3 which is vertically layered are, respectively, sandwiched with a pair of collectors 5, insulating end plates 6 and fastening plates 7. A desired pressure is applied onto the surface of the layered body 3 by fastening studs 8 through the pair of fastening plates 7 to integrate the resulting assembly. A manifold for supplying and discharging a reaction gas is airtightly fitted to each of four side walls of the layered body 3. Grooves 4 are formed on either the upper or the lower surfaces of the separator 2 so as to be perpendicular to one another, one of which serves as a passage for a fuel gas and the other of which serves as a passage for an oxidizing agent. Thus, in the fuel cell of this type, a fuel gas and air as the oxidizing agent are supplied or discharged through an opening 9a for supplying and discharging the reaction gas formed on the manifold 9 at a pressure slightly higher than the atmospheric pressure, thereby producing electric power on the basis for an electrochemical reaction. In this respect, such phosphoric acid type fuel cell stacks have been developed which are capable of operating at normal pressure having an output power on the order to 50 kw, and generator plants are known which comprise four such fuel cell stacks connected in series or parallel at the electric circuit side and which have an output power on the order of 200 kw.

FIG. 9 is a perspective cross-sectional view of a conventional pressurized fuel cell. In this fuel cell, a fuel cell stack 10 contained in a pressure vessel 11 is fixed to and supported by a lower tank 12 having a shallow dish-like lower portion and upwardly covered with an upper hanging-bell type tank 13. After the lower tank and the upper tank are linked together through a flange, pressurized nitrogen gas is sealed in the pressure vessel 11, for instance, at a pressure on the order of about 4 atm and then the fuel cell is put into practical use. In addition to the fuel cell stack 10, there are connected, for instance, piping 15 for the air for reaction piping 16 for a fuel gas, and piping 17 for supplying cooling water to each corresponding cooling plate 14. The cooling plate 14 is inserted between two neighboring blocks, each comprising a plurality of unit cells and lead-out conductor 18 for outputting the generated electricity, which are all collected on the side of the lower tank 12 which supports the stack 10 and are externally taken out while airtightly passing through the lower tank 12. Moreover, the pressure of the reaction gases such as the fuel gas and the air for reaction is maintained at, for instance, about 4 atm so that it is in equilibrium with the pressure of the nitrogen gas. The output power of a single such pressure type fuel cell stack is known to be 260 kw and there have been known generator plants having an output power on the order of 1000 kw, which comprises four such stacks connected to one another in series or parallel through the external electric circuits. In addition, there are also known those obtained by horizontally arranging four vertical layer-built type fuel cell stacks in a pressure vessel in order to increase the output capacity.

The fuel cells per se which are stationary apparatuses do not cause vibrations at all, but they vibrate due to the influence of various external forces such as those encountered during transportation and earthquakes. On the other hand, the height of a fuel cell stack whose structural material mainly comprises a carbon material having an elastic coefficient on the order of not more than 1/10 times that of a steel plate which has a large capacity becomes almost 4 m. The resonant frequency of such a fuel cell stack is low and, there, if the stack vibrates, great bending strains, and stresses are generated. The vibration in turn leads to possible slippage of each unit cell and, in the worst case, breakage of the cell. Therefore, upon transportation of the vertically layered fuel cells, a large bending stress is applied to the layered body of unit cells, and this bending stress is liable to cause damages as the vehicles or ships move up and down if the fuel cells are transported while turning them sideways. On the other hand, if the fuel cells are transported in the standing state, the greater the height of the stacks, the greater the influence of the vibration of the stacks. On the other hand, with regard to the overland transportation, the height of loading is always limited to 3.4 m or less even when a trailer is provided which has a low deck body and, therefore, fuel cell stacks having a height on the order of up to 4 m cannot be transported by overland transportation.

On the other hand, as the development of the phosphoric acid type fuel cells proceeds, it has been desired to develop fuel cells having a greater capacity for use in generating electric power, but the overland transportation thereof is greatly restricted by the limitation on the height of loading. Therefore, the fuel cell stacks should be sub-divided into a large number of portions. This in turn leads to an increase in the production cost and in the space for installing the same. One means for solving this problem is to arrange four fuel cell stacks in a vertical cylindrical pressure vessel to thus give a module. In this way, only one pressure vessel is required and thus it is expected to make the production thereof more economical and to reduce the space for installing the stack. However, this approach cannot eliminate the limitations on the height thereof encountered during overland transportation, and thus the capacity thereof cannot be increased to a desired level.

SUMMARY OF THE INVENTION

Accordingly, an object of the present invention is to provide a lateral layer-built fuel cell stack and its module structure, the fuel cell stack having a lateral layer-built structure, the stack making it possible to solve the problem of the dimensional-limit, such as the limit in height of loading encountered during the transportation thereof and hence it being able to be transported by overland transportation. Moreover, the capacity of each unit cell can be increased.

According to one aspect of the present invention, there is provided a lateral layer-built fuel cell stack which comprises:

a fuel cell layered body including a plurality of unit cells each of which has a matrix layer for holding an electrolyte, a pair of electrode layers which are disposed on both sides of the matrix layer; and a plurality of separators, each having a plurality of vertical passages for reaction gases which are substantially vertically arranged on one of major surfaces of each of the plurality of separators and a plurality of horizontal passages for reaction gases which are substantially horizontally arranged on the other of major surfaces of each of the plurality of separators; the unit cells and the separators being alternately superimposed so that each of the surfaces of the plurality of unit cells and the plurality of separators is approximately vertically arranged;

a pair of first manifolds which are disposed on the side of the upper and the lower surfaces of the fuel cell layered body and which are communicated with the plurality of vertical passages; and a pair of second manifolds which are disposed on the side of opposite side surfaces of the fuel cell layered body and which are communicated with the plurality of horizontal passages.

Here, an oxidizing agent may be supplied through the plurality of vertical passages and a fuel gas may be supplied through the plurality of horizontal passages.

One of the paired first mainfolds which are positioned on the lower side of the fuel cell layered body simultaneously may serve as a supporting member for the fuel cell layered body.

Each of the unit cell may further comprise means for supplementing the electrolyte from the upper portion of the cell.

The supplementing means may comprise:

a supply pipe which is disposed in the highest passage of the plurality of horizontal passages and which has a hole for supplementing the electrolyte located at a hydrophilic portion formed in the electrode layer;

an opening which is formed in the second manifold and connected to the supply pipe; and a cover member closing the opening during regular operations.

The electrode layer may comprise a layer of an electrode substrate and a layer of a catalyst, the hydrophilic portion may be formed in the layer of the electrode substrate and a communicating hole contiguous to the hydrophilic portion may be formed in the layer of the electrode catalyst.

According to another aspect of the present invention, there is provided a fuel cell stack module structure which comprises:

a pedestal connected to a manifold which also serves as a support member; and a plurality of the lateral layer-built fuel cell stacks as claimed in claim 3 which are laterally and vertically combined through the pedestal.

According to a further aspect of the present invention, there is provided a fuel cell stack module structure which comprises:

a pedestal drawably disposed within a laterally placed cylindrical pressure vessel; and at least one lateral layer-built fuel cell stack fixed to the pedestal, the stack being the same as that described above in which the first manifold positioned on the lower side of the fuel cell layered body among the paired first manifolds also serves as the member for supporting the fuel cell layered body.

The above and other objects, effects, features and advantages of the present invention will become more apparent from the following description of embodiments thereof taken in conjunction with the accompanying drawings.

BRIEF DESCRIPTION OF THE DRAWINGS

FIGS. 4 and 5 are schematic side views of a parallel module and a stepwise layered module of a fuel cell operated at normal pressure, respectively, the fuel cell being another embodiment according to the present invention;

FIGS. 8 and 9 are perspective and partially cutaway views of normal pressure type and pressure type fuel cell stacks of a conventional vertical layer-built type fuel cell, respectively.

DETAILED DESCRIPTION OF PREFERRED EMBODIMENTS

The present invention will hereunder be described in more detailed with reference to the following embodiments.

Figure 1:
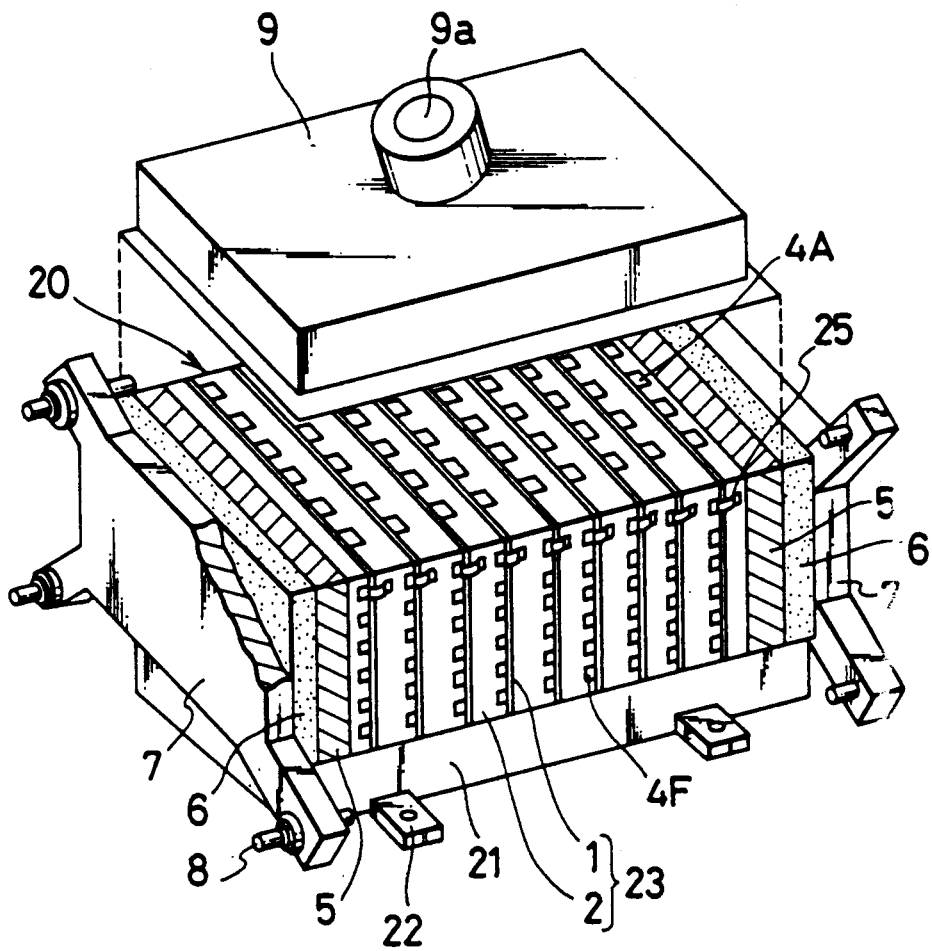
FIG. 1 is a perspective and partially cutaway view of an embodiment of the lateral layer-built fuel cell stack according to the present invention.
Figure 2:
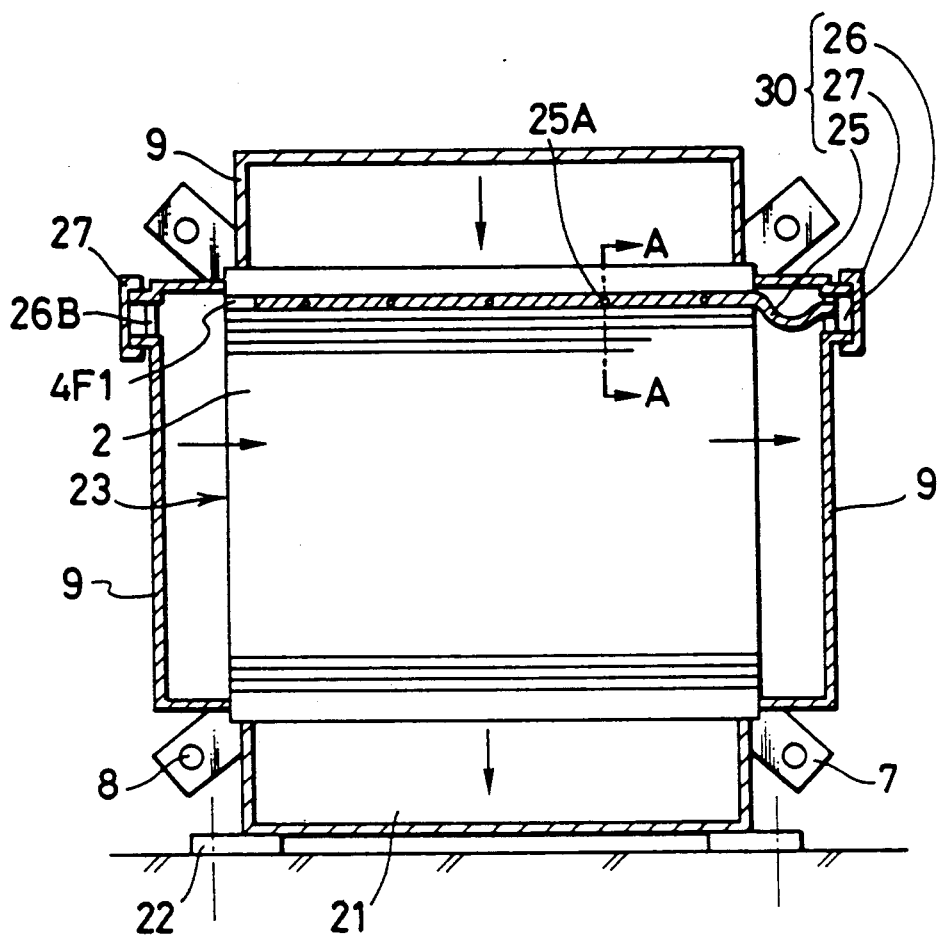
FIG. 2 is a schematic cross sectional view of a part for supplementing an electrolyte in the embodiment of the present invention.
Figure 3:
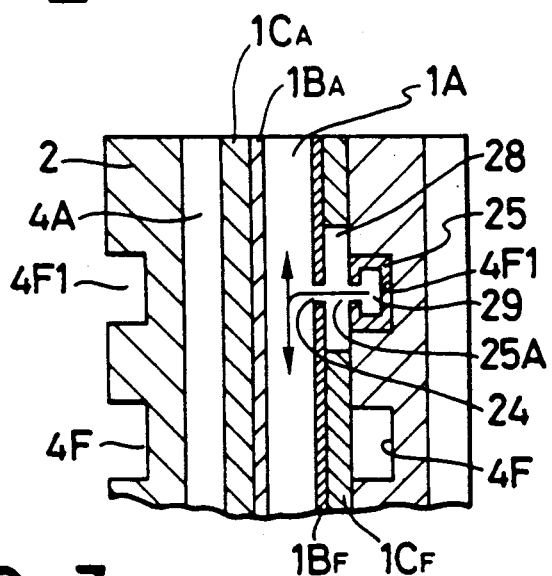
FIG. 3 is an expanded cross sectional view taken along the line A—A in FIG. 2.

FIG. 1 is a perspective and partially cutaway view of an embodiment of the lateral layer-built fuel cell stack according to the present invention; FIG. 2 is a schematic cross sectional view of a part for supplementing an electrolyte in the embodiment of the present invention; and FIG. 3 is an expanded cross sectional view taken along the line A—A in FIG. 2. In these figures, the same reference numerals are assigned to the parts having the same functions as those for the conventional fuel cells and the explanation therefore is incorporated by reference. In these figures, reference numeral 23 represents a lateral layered body of unit cells. A plurality of the unit cells 1, each of which comprises a pair of electrodes and a matrix impregnated with phosphoric acid which is sandwiched by the paired electrodes are laterally superimposed, for instance, through grooved separators 2 so that the layered surfaces of the unit cells 1 are vertically arranged, with a pair of collectors 5, insulating end plate 6 and fastening plates 7 on both layered end surfaces thereof. Then a desired pressure is applied onto the layered surfaces by fastening studs 8 to integrate the unit cells. Reference numeral 21 represents a manifold which also serves as a member for supporting the layered body, is airtightly jointed to the lower side of the lateral body 23 to thus support the same and fixing legs 22 can be fixed to a pedestal. Manifolds 9 are airtightly fitted to the remaining three sides of the layered body 23 and thus a lateral layer-built fuel cell stack 20 can be obtained. In the fuel cell stack 20, for instance, a vertical groove of the separator 2 serves as a passage 4A for an oxidizing agent, while a horizontal groove thereof serves as a passage 47 for a fuel gas.

In this way, the layered body 23 of the unit cell which is laterally layered so that the layered surfaces are vertically arranged greatly relaxes the restriction on the dimensional limit encountered when it is transported. Thus, the capacity of a single fuel cell stack of unit cells can substantially be improved and hence the demand for the development of fuel cell stacks having a large capacity can be effectively satisfied by a fuel cell stack of this type.

Since the unit cells which are horizontally positioned conventionally are positioned vertically in this invention, the phosphoric acid contained in the matrix causes a difference in the heads in proportion to the height in the direction of the faces. The differences in the heads may possibly cause a liquid leak at the lower portion of the matrix at which the head difference is great and therefore penetration thereof into the water repellent basic electrode material. The latter possibly results in interference of the supply of a reaction gas. However, it has been clear that the occurrence of these obstacles can effectively be eliminated because of the very small size of the fine pores of the matrix and the great process which has been made in the liquid tight sealing techniques and techniques for making substances water repellent. On the other hand, the loss oft phosphoric acid due to the scattering thereof is caused at the upper portion of the matrix, but the lack of phosphoric acid can easily be compensated by supplementing phosphoric acid through a portion for supplementing an electrolyte which comprises a supply pipe disposed on the stack while making use of the passage for the reaction gas which horizontally crosses through the upper portion of the matrix.

Reference numeral 25 is a pipe for supplementing phosphoric acid as an electrolyte. As shown in FIG. 2, a cross sectional view taken along the horizontal passage for the reaction gas, the pipe for the supplementation is contained within a groove 4F which is positioned, for instance, at the highest position of the horizontal passage for the reaction gas (in this case, the passage 4F for the fuel gas). The space of the groove is airtightly sealed, one end thereof is connected to an opening 26 for supplying phosphoric acid. An opening 26 is disposed on the side of the manifold 9 and is closed by a closure cap 27 during regular operations. In addition, the other end of the pipe 25 for the supplementation of phosphoic acid is sealed or connected to an opening 26B (in this case, an opening for discharge) of the opposite manifold. In this respect, the pipe 25 for the supplementation may be filled with fiber strings having good liquid retention properties and at least one hole 25A for supplementing phosphoric acid is formed at the middle of the pipe. As shown in FIG. 3, a hydrophilic portion 28 which is not made water repellent is formed in an electrode substrate layer 1C on the fuel side of the unit cell opposite to the hole 25A of the pipe 25 and a communicating hole 24 is formed in an electrode catalyst layer 1B on the fuel side. Phosphoric acid 29 which is pressed into the pipe 25 for the supplementation through the opening 26 flows into the matrix layer 1A through the hole 25A for supplementation, the hydrophilic portion 28 and the communicating hole 24 and penetrates into the matrix layer due to the difference in heads.

In the foregoing embodiment, the center of gravity of the fuel cell stack can be lowered irrespective of the number of layered unit cells by forming the fuel cell stack into a laterally layered structure and the problems of the bending stress and the bending strain which are encountered in the conventional vertical layer-built fuel cell stacks can approximately completely be eliminated by supporting the laterally layered body by the manifold which also serves as a supporting member so that the load due to the body distributes throughout the entire length of the layered body in the layered direction. Thus, the resistance to vibration of the fuel cell stack is greatly improved, the stack can be loaded on and transported by a vehicle so that the layer-built direction of the stack coincides with the longitudinal direction of the latter and thus fuel cell stacks having a great capacity per stack can be transported by overland transportation while making use of the loose restriction on the longitudinal direction during transportation.

In addition, since the height of the fuel cell is small, the operations for establishing the pipings for reaction gas and for cooling water as well as those for establishing the lead-out conductors can be easily performed the need for operations at elevated spots. Moreover, if these pipings and conductors are arranged along the layered direction, the direction along which these pipings and conductors are set up and the direction along which the fuel cell is supported can be separated from one another so that they are present on the different sides of the fuel cell respectively. Thus, operations for piping can be simplified and the structures of the pipings can be simplified and compacted.

Moreover, if the unit cells are laterally layered to obtain a fuel cell stack, a head pressure of phosphoric acid may be applied to the lower part of the matrix and hence a liquid leak at the liquid seal portions and the penetration thereof into the substrate for the electrode may possible be caused, but it is experimentally confirmed that these problems can be completely eliminated. In addition, as the loss of phosphoric acid due to scattering of phosphoric acid, mainly observed at the side of the air for reaction, together with water generated during the operation of the fuel cell is centered at the upper portion of the matrix, the loss of phosphoric acid can easily be compensated by supplementing it through the means for supplementing the same disposed at the upper part of the unit cell, while making use of the difference in the height between the heads.

On the other hand, it is known that, with regard to the uniform partition of the fuel gas into the fuel gas passage, the off gas whose specific gravity becomes high as hydrogen gas is consumed is retained at the lower part of the manifold on the outlet side in the conventional vertical layer-built fuel cells and thus the supply of the fuel gas to the unit cells positioned at the lower portion of the layered body is impeded. On the contrary, in the lateral layer-built fuel cell stack, as each unit cell is horizontally disposed in parallel arrangement and the size in the direction of height is not changed at all if the number of layered unit cells increases, the problems associated with the conventional vertical layer-built fuel cell stack can be approximately completely solved and the area of the electrode of each unit cell can effectively be used and thus the cell can be operated to generate electricity by disposing a plurality of openings for supplying the fuel gas to the manifold and for discharging the same.

In the case of the pressure type fuel cells, if the length of a laterally placed cylindrical pressure vessel is increased, fuel cell stacks having a great capacity per fuel cells can be obtained within the limited size for transportation and thus can be transported overland. In addition, if the fuel cell stack is supported by the body of the pressure vessel while holes through which the pipings and conductors are passed through the pressure cover of the vessel, the operations for connecting the pipings or the like can be easily performed by making use of a wide space within a mirror plate of the cover without interruption by the supporting portions of the fuel cell. Further, if the fuel cell stack is drawably contained in the pressure vessel, most of the assembling operations of the pipings and conductors can be performed outside the pressure vessel and thus the labor required for the operations for connecting the pipings and conductors can substantially be saved. Moreover, since a particular space for operations within the pressure vessel is not needed, the diameter of the pressure vessel can be reduced to a level as small as possible.

Moreover, if the passage for the reaction gas of each unit cell extending along the vertical direction is designed so that it serves as a passage 4A for the oxidizing agent and that the air for the reaction downward flows, a mist of phosphoric acid which scatters, towards the passage 4A for the oxidizing agent, together with the water vapor of the water generated during the reaction can be trapped by adhering it onto the inner wall of the supporting manifold 21 and thus the contamination of the unit cells and pipings can effectively be prevented by making use of the wide bottom area of the supporting manifold 21 for trapping the mist of phosphoric acid.

FIG. 4 is a schematic side view of the parallel type module structure of the lateral layer-built fuel cell which is another embodiment of the present invention, and FIG. 5 is a schematic side view of the stepwise layered module structure of the fuel cell according to the present invention. Both structures shown in these figures correspond to module structures of the fuel cell stacks which are operated at normal pressure. In FIG. 4, two lateral layer-built fuel cell stacks 20A and 20B are fixed through fixing legs 22 to a common pedestal 32 so that the layered directions thereof are parallel to one another and connected to one another in a parallel relationship through an external electric circuit. The fuel cell stacks 20A and 20B are designed in a lateral layer structure and hence the number of unit cells to be layered can easily be increased to about two times that of the conventional fuel cell stacks. Although, a bank is conventionally composed of four fuel cell stacks connected in series or parallel, a parallel type module 40 having the same capacity as that of the conventional bank can be obtained by connecting only two fuel cell stacks in a parallel relation, which leads to the reduction in the number of fuel cell stacks to be layered and that of the pipings (not shown) required. Furthermore, the operations required for the piping can be performed for every fuel cell stack and then the fuel cell stacks which have been separately subjected to piping operations can be arranged on a pedestal 32, in other words, it is not necessary to ensure any extra space for operations such as piping operations between the stacks. Thus, the present invention makes it possible to substantially save the space for installing the fuel cell stacks.

Referring now to the stepwise layered module structure shown in FIG. 5, if the fuel cell stack 20B fixed on a rest 45 is placed on the fuel cell stack 20A which is fixed to the pedestal 32 to thus form a stepwise layered type module 50, the same effects as those explained above in connection with the parallel bank 40 can be achieved. In addition, the upper fuel cell stack 20B can be stepwise layered onto the stack 20A after finishing the operations such as piping operations on the ground without performing operations at an elevated spot and thus the operations for assembling the same can substantially be simplified.

Figure 6:
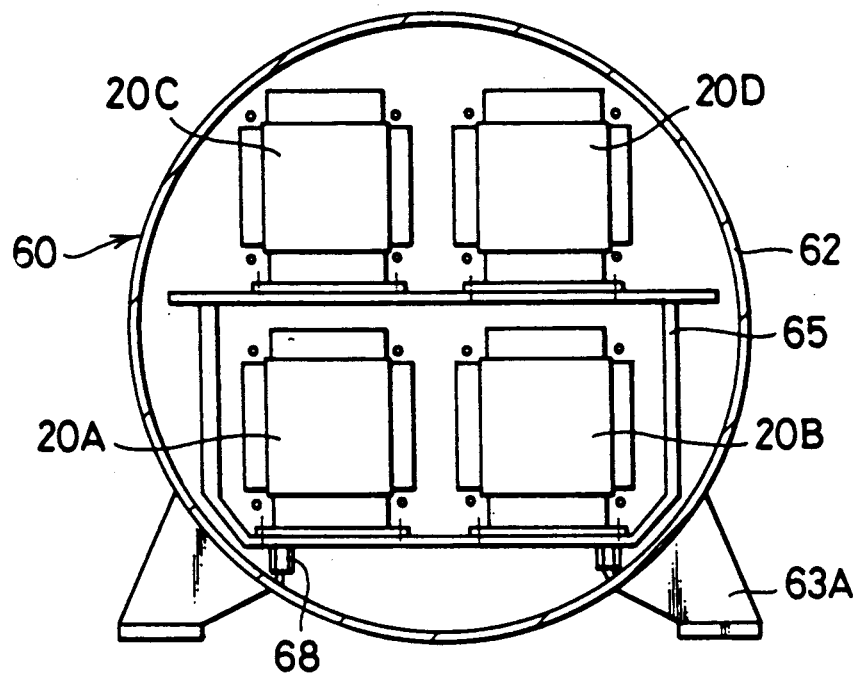
FIGS. 6 and 7 show a pressure type fuel cell module according to a further embodiment of the present invention and are schematic cross sectional views taken along the directions perpendicular to one another.
Figure 7:
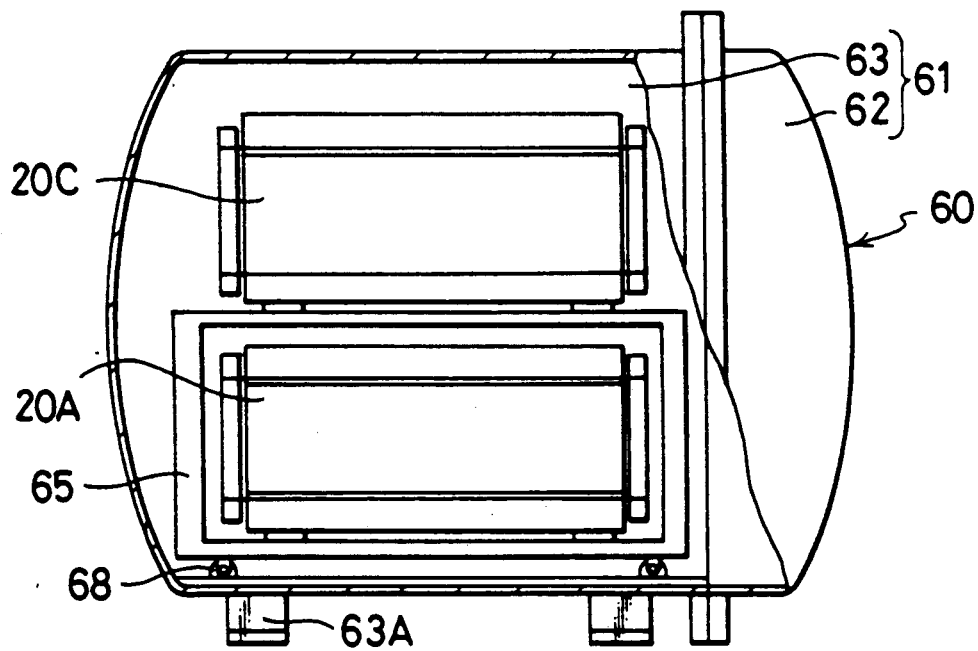
Figure 8:
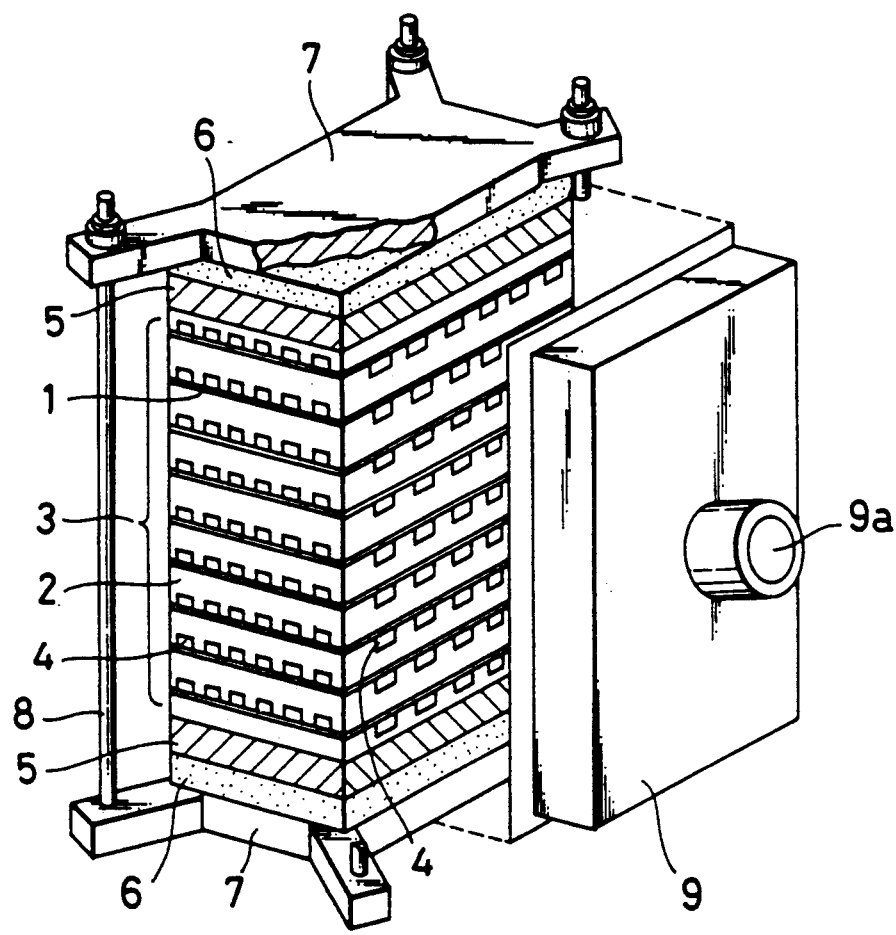

FIGS. 6 and 7 show a pressure type fuel cell module structure according to a further embodiment of the present invention and are schematic cross sectional views taken along the directions perpendicular to one another. In these figures, a pressure vessel 61 consists of a laterally placed cylindrical vessel and the vessel body 63 having legs 63A contains therein a two-stage rest 65 which is drawable from the vessel by the action of a guiding part 68 comprising wheels and rails, two lateral layer-built type fuel cell stacks 20A and 20B which are arranged on the lower stage of the rest and two lateral layer-built type fuel cell stacks 20C and 20D which are arranged on the upper stage of the rest 65. The pipings and conductors (not shown) of each fuel cell stack are guided towards the side of a cover 62 and are externally drawn out from the vessel through the side wall of the vessel body 63 near an opening or through the cover.

If the number of the unit cells to be layered to obtain lateral layer-built fuel cell stacks is increased by two times that of the conventional fuel cell stacks in the foregoing embodiments, pressure type fuel cell modules having an output capacity two times higher than that of the conventional modules 60 can be obtained within a dimensional limit for overland transportation by elongating the vessel body 63 of the laterally placed cylindrical pressure vessel 61 in the axial direction. Thus, pressure type fuel cell modules 60 having a great capacity which cannot be attained by the conventional vertical layer-built type pressure fuel cell can be formed in a size suitable for overland transportation.

In addition, the operations for piping and wiring between the lateral layer-built fuel cell stacks can be performed outside the pressure vessel, i.e., on the floor and then the stacks can be lifted to draw the rest 65 out of the pressure vessel and to thus fix the supporting manifold onto the rest. In other words, the fuel cell module 60 can be assembled without performing any operations for piping and wiring within the vessel body 63, any space for the assembly within the vessel body 63 is not necessary and, for instance, the operations for connecting pipings and distributing wires (not shown) disposed in the vicinity of the opening of the vessel body 63 to lead-out portions can also be performed outside the pressure vessel. Therefore, the size of the pressure vessel can be minimized and the incorporation of the stacks or the like into the pressure vessel can easily be performed.

As explained above, in the present invention, the layer-built body of the matrix type unit cell is realized in the lateral layer-built body and the layer-built body is supported by a manifold which simultaneously serves as a supporting member. For this reason, number of the unit cells to be layered, i.e., the capacity per single stack can be increased while the height of the lateral layer-built fuel cell stack is restricted to a low level and the center of gravity thereof is kept at a low position. Furthermore, as the supporting manifold firmly supports the weight of the layered body per se and the acceleration thereof as the distributed load, the problems of the dimensional limitation for overland transportation and of the vibration proof properties associated with the conventional vertical layer-built fuel cells can effectively be eliminated and the fuel cell stack having a high capacity per single fuel cell can be transported through overland transportation while maintaining its vibration proof properties. Thus, the present invention can provide fuel cells which satisfy the requirements of the increase in the capacity per single module without increasing the number of the stacks which constitute the module.

In addition, the loss of electrolytes such as phosphoric acid which are contained in the matrix of each of the unit cells vertically layered can be smoothly compensated by supplementing the same through the means for replenishing the electrolyte disposed at the upper part of the unit cells while making use of the difference between heads of the electrolyte, also, the problem of insufficient partition of the fuel gas into each unit cell due to the increase in the specific gravity of the off gas as a result of the consumption of hydrogen gas in the reaction gas passage can be solved by laterally layering the fuel cell stacks. Moreover, the mist of phosphoric acid can be trapped in the supporting manifold having a large bottom area to thus make it harmless by downward passing the air for reaction through the reaction gas passage.

On the other hand, when a fuel cell module operated at normal pressure or a pressure type fuel cell module having a high capacity is formed by combining a plurality of lateral layer-built fuel cells, the operations for fitting the fuel cell stacks to, for instance, a rest can be easily performed without accompanying any operations at an elevated spot after the completion of the operations for piping and wiring the stacks which are laterally placed on the floor since the drawing direction of the pipings differs from the supporting direction thereof. This leads to the reduction in the labor required for the assembly of the module. Besides, the modules having a high capacity can be formed in a compact size as any specific space for operations is not necessary between the stacks. In the case of the pressure type fuel cells, the length of the pressure vessel can be enlarged in the longitudinal direction within the wide limit allowed and thus the fuel cells and modules having a large capacity which cannot be attained by the conventional ones can be compacted to a size favorable for overland transportation. Further, the pressure vessel can be minimized as any space for operations within the pressure vessel is not necessary if the cells or the modules are formed in a drawable form.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A fuel cell stack module structure comprising:
   a pedestal connected to a manifold which also serves as a support member; and
   a plurality of lateral layer-built fuel cell stacks which are laterally and vertically combined through said pedestal, each of said plurality of lateral layer-built fuel cell stacks comprising:
   a fuel cell layered body including a plurality of unit cells each of which includes a matrix layer for holding an electrolyte; a pair of electrode layers which are disposed on both sides of said matrix layer; and a plurality of separators, each of said separators having a plurality of vertical passages for reaction gases which are substantially vertically arranged on one major surfaces of each of said plurality of separators and a plurality of horizontal passages for reaction gases which are substantially horizontally arranged on the other of said major surfaces of each of said plurality of separators, said unit cells and said separators being alternatively superimposed so that each of the surfaces of said plurality of unit cells and said plurality of separators is approximately vertically arranged, an oxidizing agent being supplied through said plurality of vertical passages and a fuel gas being supplied through said plurality of horizontal passages;
   a pair of first manifolds which are disposed on the sides of the upper and lower surfaces of said fuel cell layered body and which are communicated with said plurality of vertical passages, one of the paired first manifolds which are positioned on the lower side of the fuel cell layered body simultaneously serving as a supporting member for the fuel cell layered body; and
   a pair of second manifolds which are disposed on the side of opposite side surfaces of said fuel cell layered body and which are communicated with said plurality of horizontal passages.

2. The fuel cell stack module structure according to claim 1 wherein each of the unit cell further comprises means for supplementing the electrolyte from the upper portion of the cell.

3. The fuel cell stack module structure according to claim 2 wherein the supplementing means comprises:
   a supply pipe which is disposed in the highest passage of said plurality of horizontal passages and which has a hole for supplementing the electrolyte located at a hydrophilic portion formed in the electrode layer;
   an opening which is formed in the second manifold and connected to the supply pipe; and
   a cover member closing the opening during regular operations.

4. The fuel cell stack module structure according to claim 3 wherein the electrode layer comprises a layer of an electrode substrate and a layer of a catalyst, the hydrophilic portion is formed in the layer of the electrode substrate and a communicating hole contiguous to the hydrophilic portion is formed in the layer of the electrode catalyst.

5. A fuel cell stack module structure comprising:

a pedestal drawably disposed within a laterally placed cylindrical pressure vessel; and at least one lateral layer-built fuel stack which is fixed to the pedestal, each of said lateral layer-built fuel cell stack comprising:

a fuel cell layered body including a plurality of unit cells each of which includes a matrix layer for holding an electrolyte; a pair of electrode layers which are disposed on both sides of said matrix layer; and a plurality of separators, each of said separators having a plurality of vertical passages for reaction gases which are substantially vertically arranged on one major surfaces of each of said plurality of separators and a plurality of horizontal passages for reaction gases which are substantially horizontally arranged on the other of said major surfaces of each of said plurality of separators, said unit cells and said separators being alternatively superimposed so that each of the surfaces of said plurality of unit cells and said plurality of separators is approximately vertically arranged, an oxidizing agent being supplied through said plurality of vertical passages and a fuel gas being supplied through said plurality of horizontal passages;

a pair of first manifolds which are disposed on the side of the upper and lower surfaces of said fuel cell layered body and which are communicated with said plurality of vertical passages, one of the paired first manifolds which are positioned on the lower side of the fuel cell layered body simultaneously servicing as a supporting member for the fuel cell layered body; and a pair of second manifolds which are disposed on the side of opposite side surfaces of said fuel cell layered body and which are communicated with said plurality of horizontal passages.

6. The fuel cell stack module structure according to claim 5 wherein each of the cell unit cell further comprises means for supplementing the electrolyte from the upper portion of the cell.

7. The fuel cell stack module structure according to claim 6 wherein the supplementing means comprises:

a supply pipe which is disposed in the highest passage of said plurality of horizontal passages and which has a hole for supplementing the electrolyte located at a hydrophilic portion formed in the electrode layer;

an opening which is formed in the second manifold and connected to the supply pipe; and a cover member closing the opening during regular operations.

8. The fuel cell stack module structure according to claim 7 wherein the electrode layer comprises a layer of an electrode substrate and a layer of a catalyst, the hydrophilic portion is formed in the layer of the electrode substrate and a communicating hole contiguous to the hydrophilic portion is formed in the layer of the electrode catalyst.

* * * * *